(12) United States Patent
Patel et al.

(10) Patent No.: US 11,920,085 B2
(45) Date of Patent: Mar. 5, 2024

(54) WATER-SOLUBLE POLYMER SLURRY FOR FRACTURING FLUIDS

(71) Applicant: PfP INDUSTRIES, LLC, Houston, TX (US)

(72) Inventors: Nikhil Patel, Houston, TX (US); Michael J. Callanan, Houston, TX (US)

(73) Assignee: PfP Industries LLC, Houston, TX (US)

(*) Notice: Subject to any disclaimer, the term of this patent is extended or adjusted under 35 U.S.C. 154(b) by 12 days.

(21) Appl. No.: 17/022,468

(22) Filed: Sep. 16, 2020

(65) Prior Publication Data

US 2021/0130679 A1 May 6, 2021

Related U.S. Application Data

(63) Continuation of application No. 15/142,896, filed on Apr. 29, 2016, now Pat. No. 10,793,768.

(51) Int. Cl.
*C09K 8/68* (2006.01)
*C09K 8/80* (2006.01)
*C09K 8/88* (2006.01)

(52) U.S. Cl.
CPC .......... *C09K 8/68* (2013.01); *C09K 8/80* (2013.01); *C09K 8/882* (2013.01); *C09K 2208/28* (2013.01)

(58) Field of Classification Search
None
See application file for complete search history.

(56) References Cited

U.S. PATENT DOCUMENTS

| | | | |
|---|---|---|---|
| 4,325,861 A | 4/1982 | Braun et al. | |
| 4,499,214 A | 2/1985 | Sortwell | |
| 4,957,166 A | 9/1990 | Sydansk | |
| 5,030,366 A | 7/1991 | Wilson et al. | |
| 5,091,448 A | 2/1992 | Hostettler et al. | |
| 5,151,131 A | 9/1992 | Burkhalter et al. | |
| 5,292,367 A | 3/1994 | Bloys et al. | |
| 5,362,713 A | 11/1994 | Westland et al. | |
| 5,834,533 A | 11/1998 | Patel et al. | |
| 5,866,517 A | 2/1999 | Carpenter et al. | |
| 5,942,467 A | 8/1999 | Rayborn, Sr. et al. | |
| 6,063,737 A | 5/2000 | Haberman et al. | |
| 6,258,756 B1 | 7/2001 | Hayatdavoudi | |
| 6,620,769 B1 * | 9/2003 | Juppe | C04B 24/36 507/213 |
| 6,734,145 B2 | 5/2004 | Rayborn | |
| 6,818,597 B2 | 11/2004 | Harris | |
| 6,828,280 B2 | 12/2004 | England et al. | |
| 7,067,459 B2 | 6/2006 | Pakulski et al. | |
| 7,094,738 B2 | 8/2006 | Patel et al. | |
| 7,147,067 B2 | 12/2006 | Getzlaf et al. | |
| 7,168,489 B2 | 1/2007 | Frost et al. | |
| 7,256,159 B2 | 8/2007 | Guichard et al. | |
| 7,271,134 B2 | 9/2007 | King et al. | |
| 7,281,581 B2 | 10/2007 | Nguyen et al. | |
| 7,293,609 B2 | 11/2007 | Dealy et al. | |
| 7,304,019 B2 | 12/2007 | Lin et al. | |
| 7,323,434 B2 | 1/2008 | Su et al. | |
| 7,384,892 B2 | 6/2008 | Melbouci et al. | |
| 7,461,697 B2 | 12/2008 | Todd et al. | |
| 7,524,796 B1 | 4/2009 | Heilman et al. | |
| 7,565,929 B2 | 7/2009 | Bustos et al. | |
| 7,622,427 B2 | 11/2009 | Sau et al. | |
| 7,677,315 B2 | 3/2010 | Saini et al. | |
| 7,799,744 B2 | 9/2010 | Welton et al. | |
| 7,829,506 B1 | 11/2010 | Tehranchi | |
| 7,832,962 B1 | 11/2010 | Andreyev et al. | |
| 7,879,768 B2 | 2/2011 | Wu | |
| 7,902,128 B2 | 3/2011 | Zhang et al. | |
| 8,030,252 B2 | 10/2011 | Shumway | |
| 8,044,000 B2 | 10/2011 | Sullivan et al. | |
| 8,252,728 B2 | 8/2012 | Karagianni et al. | |
| 8,354,360 B2 | 1/2013 | Phatak | |
| 8,450,386 B2 | 5/2013 | Melbouci | |
| 8,579,029 B2 | 11/2013 | Abad et al. | |
| 8,623,792 B2 | 1/2014 | Iverson et al. | |
| 8,669,213 B2 | 3/2014 | Gupta et al. | |
| 8,728,989 B2 | 5/2014 | Kakadjian, Sr. et al. | |
| 8,757,261 B2 | 6/2014 | Weaver et al. | |
| 8,863,838 B2 | 10/2014 | Armstrong et al. | |
| 8,865,632 B1 | 10/2014 | Parnell et al. | |
| 9,018,142 B2 | 4/2015 | Revision, Jr. et al. | |
| 9,027,646 B2 | 5/2015 | Svarczkopf et al. | |
| 9,034,802 B2 | 5/2015 | Ahrenst et al. | |
| 9,034,805 B2 | 5/2015 | Rey et al. | |
| 2008/0318812 A1 * | 12/2008 | Kakadjian, Sr. | C09K 8/035 507/221 |
| 2012/0157356 A1 * | 6/2012 | Dawson | C09K 8/68 507/225 |
| 2012/0247763 A1 | 10/2012 | Rakitsky et al. | |
| 2012/0289436 A1 | 11/2012 | Woodward et al. | |
| 2013/0196884 A1 | 8/2013 | Kakadjian et al. | |
| 2013/0244912 A1 | 9/2013 | Hughes et al. | |
| 2013/0255951 A1 | 10/2013 | Little et al. | |
| 2013/0288934 A1 | 10/2013 | Powell et al. | |
| 2013/0319656 A1 | 12/2013 | Brownlee | |

(Continued)

*Primary Examiner* — Jeffrey D Washville

(74) *Attorney, Agent, or Firm* — Robert W. Strozier

(57) ABSTRACT

The present disclosure relates to fracturing fluids that use friction reducers. The composition of the present disclosure is a slurry comprising a water-soluble polymer suspended in an oil-based vehicle with the aid of a suspension agent and a surfactant.

15 Claims, No Drawings

(56) References Cited

U.S. PATENT DOCUMENTS

| | | |
|---|---|---|
| 2014/0014348 A1 | 1/2014 | Mahoney et al. |
| 2014/0051610 A1 | 2/2014 | Perry et al. |
| 2014/0060843 A1 | 3/2014 | Murphy et al. |
| 2014/0066342 A1 | 3/2014 | Paul et al. |
| 2014/0076549 A1 | 3/2014 | Pelletier et al. |
| 2014/0087974 A1 | 3/2014 | Villareal et al. |
| 2014/0128294 A1 | 5/2014 | Gatlin et al. |
| 2014/0174724 A1 | 6/2014 | Livanec |
| 2014/0273168 A1 | 9/2014 | Dillon et al. |
| 2014/0305651 A1 | 10/2014 | Hill, Jr. et al. |
| 2014/0318788 A1 | 10/2014 | Agrawal et al. |
| 2014/0352945 A1 | 12/2014 | Danait et al. |
| 2014/0364345 A1 | 12/2014 | Sundaram et al. |
| 2015/0013987 A1 | 1/2015 | Underwood et al. |
| 2015/0021027 A1 | 1/2015 | Chapman |
| 2015/0027710 A1 | 1/2015 | Miller |
| 2015/0096751 A1 | 4/2015 | Shen et al. |
| 2015/0099635 A1 | 4/2015 | Holliday et al. |
| 2015/0114638 A1 | 4/2015 | Taylor |
| 2015/0191647 A1 | 7/2015 | Kakadjian et al. |
| 2016/0369153 A1* | 12/2016 | Ali .......................... C08K 5/17 |
| 2018/0155615 A1 | 6/2018 | Rahy |

\* cited by examiner

WATER-SOLUBLE POLYMER SLURRY FOR FRACTURING FLUIDS

RELATED APPLICATIONS

This application is a continuation of U.S. patent application Ser. No. 15/142,896 filed Apr. 29, 2016, now U.S. Pat. No. 10,793,768 issued Oct. 6, 2020.

BACKGROUND

Oil field fracturing jobs are done in many ways using many different combinations of fluids, solids, and gases. The combinations are determined by availability, environmental impact, cost, and effectiveness in the given formations. The fluids used can be simple mixtures to very complex formulations requiring reactors or blending of components under heat or pressure.

In order to complete a fracturing job, large pumps using huge amounts of horsepower, large mixing units, and specialized equipment are used in combination to create the fast mixing, pump pressure, and volumes of fracturing fluid to force open the rock in the formation. High viscosity proppant carrier fluids are commonly used to carry large volumes of sand or other proppant into the fractures to hold open the small cracks when the fracturing is completed. These carrier fluids are often cross-linked guar or modified guar fluids. Such fluids can maintain 100 cps or more to carry the sand far into the formation. These fluids are expensive, require large amounts of horsepower to pump, and can be sensitive to the condition of the water used to create the fluid.

Friction reducing fluids can also be used to carry proppants into fracturing formations, as an alternative to a high-viscosity proppant carrier fluid. These fluids use high velocity instead of high viscosity to carry large proppant particles into formation fractures. High velocity fluid delivery is created by using significantly higher pump rates than what is used to carry high viscosity fluids.

Once the proppant is placed into the formation, the carrier fluid viscosity is decreased by heat or additives. Once the viscosity is reduced, the water component of the carrier fluid can return to the surface, leaving the proppant behind in the fractures of the formation. This returning water is called flowback water or produced water. If proppant returns to the surface with the flowback water, then that is an indication that the carrier fluid did not carry the proppant far enough into the formation or that the carrier did not break down soon enough in the delivery process. Proppant returning to the surface with flowback water is detrimental to the outcome of the fracturing job. Significant loss of proppant from a fracturing formation will cause some or all of the individual fractures to close, which reduces the amount of oil or gas accessible for extraction.

Guar slurries are proppant carrier fluids with particularly high viscosity. Guar slurries can carry large volumes of large-grain proppant deep into a fracturing formation. Disadvantages of guar-based proppant carrier fluids that the present inventors have appreciated is that guar slurries require large amounts of horse power to pump, require large volumes of polymer and other chemicals to manufacture, and often must be suspended in purified drinking water in order to achieve a workable stability.

Friction reducers typically have fewer additives than guar-based carrier fluids, and require less horsepower to pump the fluid at high rates. Additionally, the water used to suspend friction reducers does not have to be as free from impurities as the water used in known guar-based proppant carrier fluids must be. The inventors have recognized a disadvantage of friction reducer fluids, in that they do not carry large volumes of proppant at one time and cannot carry the larger-grain proppant as far out into the formation as a high viscosity carrier fluid (like a cross-linked guar gel) can. Friction reducer fluids often require more water because such fluids cannot carry as much proppant at one time. On the other hand, friction reducers can be used in conjunction with fresh water, brackish water, salt water, sea water, produced water, or flowback water, while most high-viscosity fluids cannot tolerate the impurities of these water sources.

Friction reducers for creating friction reducer proppant carrier fluids are currently available to well operators in three forms: dry powder, oil-based emulsions, and water-based suspensions. The inventors have observed that the dry powder form is less expensive, and safer to transport to the well formation site. The inventors have recognized a disadvantage of the dry powder form in that hydrating the powder to form the carrier fluid on site is not well-suited to typical expected pump rates. The interface between the dry powder and the hydrating fluid often creates blockages at the place of intersection.

Oil-based emulsions are an alternative to dry powders. The process by which oilbased emulsions are manufactured uses a reactor and heat to bond a dry polyacrylic backbone with water and oil into an emulsion. The inventors have observed that the oil-emulsion manufacturing process is cumbersome, it has a relatively negative environmental impact, and presents safety concerns. Additives in some known oil-emulsions, such as esters, are environmentally toxic. Such toxicity presents challenges in transporting, using, and disposing of oil-emulsion friction reducers.

Finally, water-based suspensions offer an alternative to the problems associated with dry powder and oil-based emulsions, but are much less efficient. It requires a much larger volume of a water-based suspension to deliver the same effective amount of friction reducer as a powders or an oil-emulsion. The large volumes of water-based suspensions involved in providing friction reducers presents undesirable obstacles for transportation, storage, and use of such friction reducers. As such, the inventors have recognized a need in the art for an alternative delivery of friction reducers for creating friction reduction-based proppant carrier fluids.

DETAILED DESCRIPTION

The present disclosure relates to fracturing fluids that use friction reducers. The composition of the present disclosure is a slurry comprising a water-soluble polymer suspended in an oil-based vehicle with the aid of a suspension agent and a surfactant. The approximate size of the water-soluble polymer is preferably 75-200 mesh. Specifically, the water-soluble polymer is polyacrylamide and the oil-based vehicle is petroleum distillate. Petroleum distillates are products distilled from petroleum crude oil and use different Cas # identifiers depending upon the molecular weight distribution and processing technology used. A petroleum distillate suitable for the present composition can be, for example, Cas #64742-47-8. The surfactant is an ethoxylated nonionic emulsifier. The surfactant can be a fatty chain EO/PO (ethylene oxide propylene oxide) and/or oxylated propoxy copolymer. The suspension aid is any variation of diblock copolymers based on styrene and ethylene/propylene. The composition may also contain a dispersant such as organophilic clay or a synthetic alternative as the suspension agent.

In a preferred embodiment, the composition contains up to 55% polyacrylamide, up to 70% petroleum distillate, up to 5% surfactant, and up to 5% dispersant. In a further preferred embodiment, the present composition contains 45-70% oil vehicle, 1-5% surfactant, 1-5% suspension agent, and 25-50% wt. dry polyacrylamide. An example of a suspension agent suitable for this embodiment is Kraton® G 1701 (Kraton is a registered trademark Kraton Polymers LLC); a clear, linear diblock copolymer based on styrene and ethylene/propylene with a polystyrene content of 37%.

The water-soluble polymer of the present composition is preferably polyacrylamide. Polyacrylamide in its dry form resembles granular particles. Alternatively, polyacrylamide can be hydrolyzed or emulsified via a synthesized process involving controlled environment aqueous chemical reactions. The present composition, however, provides a new alternative delivery for polyacrylamide: a non-aqueous polyacrylamide slurry, using an oil-based suspension. The inventors have found that an oil-based suspension of a water-soluble polymer creates superior stability, and improved performance as compared to aqueous emulsions and other known forms of polyacrylamide.

The composition of the present disclosure provides the transport and safety advantages of a dry powder with the ease-of-use of an oil-based emulsion. The present composition can be easily and quickly hydrated onsite at a well formation, in an on-the-fly application, therefore overcoming the disadvantages of a dry powder. The present composition is not manufactured using a reactor or particularly toxic reagents, and therefore overcomes the environmental and safety disadvantages associated with known oil-based emulsions. The environmental impact is of the present composition is improved over known friction reducers, and is available as a concentrate with minimal packaging. The efficient delivery, improved safety profile of the components, and ease of hydration thus reduces the environmental impact of manufacture, transport, use, and disposal of the presently disclosed friction reducer and associated carrier fluid.

Polyacrylamide is a hydrophilic, water-soluble polymer that can comprise nonionic, cationic, anionic, or zwitterionic charge. Hydrated polyacrylamide of powder origins can reduce friction and turbulence in a system allowing faster pump rates and reducing pumping pressures all while carrying sufficient proppant for typical oil and gas well applications. Dry powder polyacrylamide can be hard to utilize as it absorbs ambient moisture and is prone to aggregation and clump formation. Decreasing the particle size of the powder enhances the hydration and inversion rate of the polyacrylamide, but exacerbates the powder's absorption of moisture.

The inventors have found that slurrying polyacrylamide in a hydrophobic oil with a suspension agent and a surfactant provides a readily soluble source of polymer with superior shelf life and resistance to ambient moisture. Suitable suspension agents include organophilic clay or a synthetic alternative. An example of a synthetic alternative to organophilic clay is a linear diblock copolymer based on styrene and ethylene/propylene. A styrene-ethylene/propylene-(styrene) polymer is a thermoplastic elastomer that is easy to manufacture and effective in helping keep the polyacrylamide in suspension.

The oil and surfactant provide a base fluid in which the dry powder polyacrylamide is suspended. Slurrying the polyacrylamide eliminates aggregation and clump formation. Specifically, the slurry formulation coats the individual polyacrylamide granules in oil and surfactant, which acts as a barrier preventing particle-to-particle cohesion. The oil in the slurry also insulates the polyacrylamide for moisture exposure from the environment to prevent premature hydration which can degrade and destabilize the fluid. Providing the polyacrylamide in a pre-suspended rather than dry form also promotes rapid dispersion of the polyacrylamide into the carrier fluid on site. When the slurry is added to water to form the proppant carrier fluid, the slurried polyacrylamide disperses with minimal particle clumping (sometimes referred to as "fish eyes"). Promoting dispersal maximizes particle hydration, which, in turn, enhances overall performance by reducing the drag caused by particle aggregation. In flow loop tests, the slurry of the present disclosure out-performs dry polyacrylamide powder in terms of enhanced drag reduction.

Known emulsions are formed from polymerized emulsions including water, monomers, and surfactants. Upon combination, the monomers, initiators, and dispersion media (and optionally a colloid stabilizer) form a non-homogeneous mixture. The components then form colloidal particles containing the formed polymer. For oil and gas field applications, emulsion polymerization is typically carried out through a batch process in which all ingredients are staged in a vessel before polymerization can occur.

In contrast to known emulsions, the present composition is a mixture of carrier solvent, water soluble polymers, dispersant, and ethoxylated surfactant. Preferred embodiments of the present composition do not require traditional emulsion polymerization at all. Eliminating the need for traditional polymerization reactions, in turn, eliminates the demands of temperature control and the need for equipment such as reactionary vessels. As such, the present composition provides a polymer with improved environmental impact. Additionally, the petroleum distillate of the present composition is not a white medicinal oil, or other highly refined oil phase, making the formulation of the present composition easier to manufacture and less resource intensive.

Another advantage of the present disclosure is that the formulation can use a wide range of surfactants, as compared to traditional polymer emulsions that will only tolerate a narrow range of surfactants. Unlike slurries that consist of concentrated polymer solutions, the water-in-oil emulsions of the present disclosure provide a two-phase heterogeneous system comprising a hydrogel of water-soluble polyacrylamide in oil. Water composes 20% to 40% of the carrier fluid end product. The balance of the surfactant chemistry of the present disclosure is responsible for creating a stable emulsion. The composition contains a stabilizing surfactant to maintain the water-in-oil emulsion of the base fluid. The composition also contains an inverting surfactant to help emulsify the oil phase in the proppant carrier water, which helps to dissolve and hydrate the polyacrylamide.

Emulsions formed through synthesis reactions using heat and reactors require a delicate balance of components. The end product cannot be customized or varied. The present composition overcomes such limitations by tolerating a greater degree of customization and variance in additives without the risk of destabilizing the emulsion. Because the slurry does not rely on a synthesis reaction, the end product can be changed. As a result the present composition can use less surfactant and utilize a wider range of surfactants.

The hydrophile-lipophile balance (HLB), is the balance of the size and strength of the hydrophilic and lipophilic groups of a surfactant. A surfactant with an HLB number below that of 9 is considered lipophilic, while an HLB above 11 is considered hydrophilic. HLB values between 9-11 are intermediate. The present polyacrylamide slurry only requires inclusion of a surfactant for stability, which can correspond to anything from 3-16 in HLB value. An emulsion, in contrast, requires specific surfactants for initiation, stability, and dispersion each surfactant having a much narrower HLB range.

Polyacrylamide granules can have different particle sizes. Different particle sizes impart different characteristics to the final product. By choosing a particle size, or a particular ratio of different particle sizes, a user can customize the performance of the slurry or create a product that has varying properties.

One property that particle size influences is inversion rate. Large particles yield longer inversion times while smaller particles yield faster inversion times. By creating a slurry with smaller particles, a polyacrylamide friction reducer can be created that has a comparable or better inversion rate as compared to traditional emulsions, powder, or aqueous suspensions. Smaller particles also allow for faster hydration, and provide better overall drag reduction.

Another aspect of the present composition that can be customized is polymer loading. Changing particle size can influence the active solids in the end product, in order to decrease or increase certain attributes of the product's performance. For instance, decreasing or increasing particle size allows more or less active polymer to be added to the base fluid by changing the viscosity and flow characteristics of the fluid. Specifically, decreasing particle size allows a higher polymer loading, as it reduces viscosity and improves flow in the slurry compared to larger particles at similar loadings. By combining the influences of particle size and polymer loading, the end product can be further customized to different applications and preferences.

In a preferred embodiment, the present slurry has a 30-50% greater hydration capacity per loading than traditional emulsions, which imparts the carrier fluid with accordingly better proppant carrying capacity. By controlling the slurry viscosity and the hydration viscosity a user can create a customized proppant carrier fluid that fits a particular manufacturing, storage, transport, pump rate, well depth, or other scenario.

Increasing the polymer loading also allows polyacrylamide slurries of the present disclosure to utilize lower relative volumes while achieving the same performance as traditional emulsions. To illustrate, traditional emulsions are typically used at loadings of 0.50 gpt-1.0 gpt (gallons per thousand gallons of water). Aqueous concentrates require large volumes (volumes upwards of 8 gpt can be used) as well since they comprise mostly water. Slurries of the present disclosure can be used at much lower concentration-such as 0.1 gpt to 0.5 gpt—while still providing improved drag reduction performance as compared to traditional emulsions, dry powders, and aqueous liquid concentrate.

Additionally, known emulsions consist of high molecular weight polymers (24 million or higher). Slurries of the present disclosure can utilize much lower molecular weights (as low as 12 million), yet still give comparable drag reduction performance, even at lower loadings. Drag reduction and proppant delivery are the two primary functions of a friction reducer carrier fluid. Using particle size to increase polymer loading also increases the hydration viscosity and the downhole viscosity creating better proppant carrying properties.

The slurries of the present disclosure can also be modified to reduce free fluid in the final manufactured product by adding organophilic clay or a synthetic alternative. Traditional emulsions cannot be modified in this way. The addition of organophilic clay overcomes potential problems with free fluid and settling, resulting in a more stable product than a traditional emulsion. Alternatively, additional surfactants or adjustments in particle size can be used to reduce free fluid and settling.

What is claimed is:

1. A fracturing fluid composition comprising;
a slurry comprising:
an oil-based vehicle comprising:
between 45% and 70% of a petroleum distillate,
between 1% and 5% of a suspending agent comprising a thermoplastic elastomer, and
no white medicinal oil, and
between 25 and 50% of a dry particulate water-soluble polymer comprising water-soluble polymer particles,
a water source selected from the group consisting of fresh water, brackish water, salt water, sea water, produced water, flowback water, and mixtures thereof, and
a proppant,
wherein:
the oil-based vehicle coats the polymer particles reducing particle-to-particle cohesion, the suspending agent suspends the coated polymer particles in the slurry reducing a rate of particle settling, and
the coated particles cause the fracturing fluid to have a reduced rate of particle clumping or fish eye formation, to have an increased rate of polymer particle hydration, to have a reduced value of fluid drag or friction caused by particle aggregation, and to have an improved proppant carrier capacity.

2. The composition of claim 1, wherein the proppant is sand.

3. The composition of claim 1, wherein:
the water-soluble polymer particles are selected from the group consisting of a dry nonionic, cationic, anionic, or zwitterionic polyacrylamide particles, wherein the particles have particle sizes ranging between 75 mesh (200 μm) and 200 mesh (74 μm), and
the thermoplastic elastomer comprises a linear block copolymer based on styrene and ethylene/propylene, or a styrene-ethylene/propylene-styrene polymer.

4. The composition of claim 1, wherein the slurry is present in an amount between 0.1 gpt and 0.5 gpt.

5. The composition of claim 1, wherein the oil-based vehicle further comprising:
between 1% and 5% of a surfactant having a HLB value between 3 and 16.

6. The composition of claim 5, wherein the surfactant selected from the group consisting of:
a hydrophilic surfactant, a lipophilic surfactant, and a hydrophilic surfactant and a lipophilic surfactant.

7. A fracturing fluid composition comprising;
a slurry comprising:
an oil-based vehicle comprising:
between 45% and 70% of a petroleum distillate,
between 1% and 5% of a suspending agent comprising a thermoplastic elastomer,
between 1% and 5% of of a surfactant having a HLB value between 3 and 16
no white medicinal oil, and
between about 25% and 50% of a dry particulate water-soluble polymer comprising water-soluble polymer particles,
a water source selected from the group consisting of fresh water, brackish water, salt water, sea water, produced water, flowback water, and mixtures thereof, and a proppant, wherein:

the oil-based vehicle coats the polymer particles reducing particle-to-particle cohesion, the suspending agent suspends the coated polymer particles in the slurry reducing a rate of particle settling, the coated particles cause the fracturing fluid to have a reduced rate of particle clumping or fish eye formation, to have an increased rate of particle hydration, to have a reduced value of fluid drag or friction caused by particle aggregation, and to have an improved proppant carrier capacity.

8. The composition of claim 7, wherein the surfactant selected from the group consisting of:

a hydrophilic surfactant, a lipophilic surfactant, and a hydrophilic surfactant and a lipophilic surfactant.

9. The composition of claim 7, wherein the proppant comprises sand.

10. The composition of claim 7, wherein:

the water-soluble polymer particles are selected from the group consisting of dry powdered nonionic, cationic, anionic, or zwitterionic polyacrylamide particles have particle sizes ranging between 75 mesh (200 μm) and 200 mesh (74 μm), and the thermoplastic elastomer comprises a linear block copolymer based on styrene and ethylene/propylene, or a styrene-ethylene/propylene-styrene polymer.

11. The composition of claim 7, wherein the slurry is present in an amount between 0.1 gpt and 0.5 gpt.

12. A fracturing fluid composition comprising;

a slurry comprising:

an oil-based vehicle comprising:

between 45% and 70% of a petroleum distillate, between 1% and 5% of a suspending agent comprising a thermoplastic elastomer, between 1% and 5% of a surfactant having a HLB value between 3 and 16, and no white medicinal oil, and a particulate water-soluble polyacrylamide comprising water-soluble polymer particles having particle sizes ranging between 75 mesh (200 μm) and 200 mesh (74 μm) and having molecular weights as low as 12 million, a water source selected from the group consisting of fresh water, brackish water, salt water, sea water, produced water, flowback water, or combinations thereof, and a proppant, wherein:

the slurry is present in the fracturing fluid in an amount between 0.1 gpt and 0.5 gpt, the oil-based vehicle coats the polyacrylamide particles reducing particle-to-particle cohesion, the suspending agent suspends the coated polyacrylamide particles in the slurry reducing a rate of particle settling, and the coated polyacrylamide particles cause the fracturing fluid to have a reduced rate of particle clumping or fish eye formation, to have an increased rate of particle hydration, to have a reduced value of fluid drag or friction caused by particle aggregation, and to have an improved proppant carrier capacity.

13. The composition of claim 12, wherein the surfactant are selected from the group consisting of:

a hydrophilic surfactant, a lipophilic surfactant, and a hydrophilic surfactant and a lipophilic surfactant.

14. The composition of claim 12, wherein the proppant comprises sand.

15. The composition of claim 12, wherein:

the water-soluble polyacrylamide particles are selected from the group consisting of dry powdered nonionic, cationic, anionic, or zwitterionic polyacrylamide particles, and the thermoplastic elastomer comprises a linear block copolymer based on styrene and ethylene/propylene, or a styrene-ethylene/propylene-styrene polymer.

\* \* \* \* \*